Sept. 10, 1929.  M. P. ROKOS  1,727,904
IMPLEMENT HANDLE AND DEVICE FOR HOLDING TOOLS
Filed Sept. 12, 1927
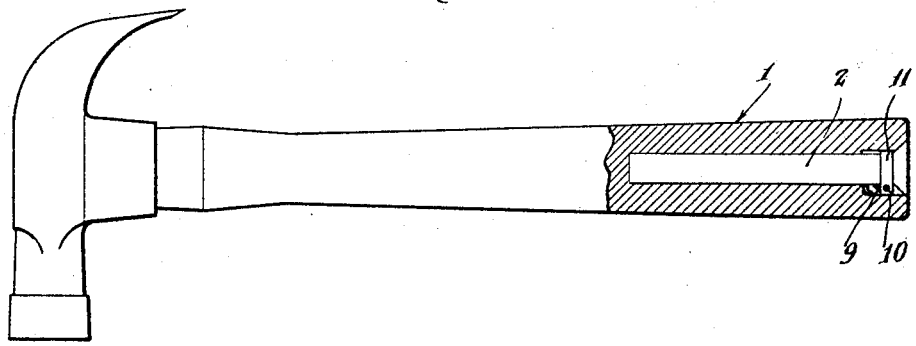
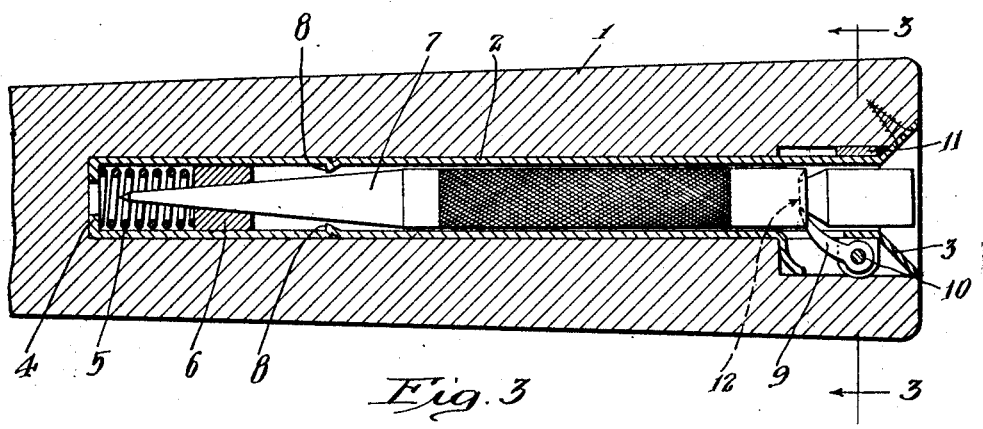
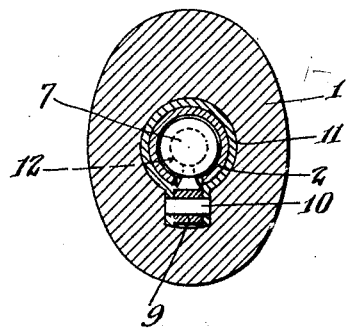
Inventor
Michael P. Rokos
By Lyon & Lyon
Attorneys Patented Sept. 10, 1929.

1,727,904

UNITED STATES PATENT OFFICE.

MICHAEL P. ROKOS, OF LOS ANGELES, CALIFORNIA.

IMPLEMENT HANDLE AND DEVICE FOR HOLDING TOOLS.

Application filed September 12, 1927. Serial No. 218,877.

This invention pertains to an implement handle containing a device for retaining small tools, said device ejecting said tools when desired.

An object is to disclose in combination an implement handle and a device for retaining small tools. Another object is to disclose a device adapted to be inserted in an implement handle and to retain and eject small tools placed within said device.

Small tools such as screwdrivers, punches, chisels and the like are being constantly lost by artisans and mechanics of the various crafts, as these tools are small and easily misplaced. All of these craftsmen employ, in addition to small tools of the above class, larger tools or implements which may be said to be essential to their work to a greater degree than the smaller tools or implements. My invention is directed toward a device adapted to be inserted in an implement or larger tool handle, or in other ways made a part thereof, such device forming a receptacle for smaller tools or parts of said larger implement.

For purposes of illustration of one preferred form of my invention, I shall refer to the attached drawings in which Fig. 1 is a side view of a carpenter's hammer containing my device, Fig. 2 is an enlarged sectional elevation of my device, and Fig. 3 is a sectional view along the line 3—3 of Fig. 2.

My device comprises a hollow elongated body portion 2 preferably of metal which may be tubular, hexagonal or rectangular in cross section depending upon circumstances and the tool desired to be carried within said device suitably fixed within the implement handle 1. A tubular body portion is here shown merely for purposes of illustration. Said body portion 2 is preferably equipped with an enlarged outlet end 3, the opposite end embedded in the tool being either open, closed or partly closed as shown at 4. A spring 5 for other activating means is positioned within the body portion and, as shown, is retained by a slidable collar or other detent 6 (preferably of same geometric cross section as the body portions 2) which comes in contact with the inserted tool 7 (in this case a punch) when said tool is retained within the device, the spring 5 being compressed by the insertion of the tool 7. When said tool is withdrawn from my device, the spring expands moving the collar or detent 6 against detents 8 which may be one or more protuberances formed upon the interior of the body portion 2. The retaining means may comprise a pawl or catch 9 pivoted as shown at 10 between ends of a collar 11 encircling the body portion, or in any other suitable way. The pawl 9 and pivot 10 are preferably made of non-rusting material so as to insure continued working. The pawl 9 is also preferably made fairly large and heavy and so designed as to engage with a shoulder or depression 12 made in the upper section of the tool 7, thereby retaining the tool within the device.

The tool 7 may be ejected from the device by merely manually pressing the end of the tool protruding in the enlarged outlet 3, thereby causing the pawl or catch 9 to fall out of the groove or shoulder 12 by gravity and enabling the expansive force of the spring 5 transmitted by collar 6 to the tool 7 to eject said tool from the device. In order to insert and retain the tool 7 within my device, the implement and handle 1 are turned over so as to cause the pawl 9 to assume a position above the body portion 2 and the tool 7 is manually inserted, thereby compressing spring 5 and causing the pawl 9 to fall and engage with the shoulder 12.

The small tool will not be ejected from the device, no matter what position is assumed by the combined device and implement handle as the spring holds the pawl or catch firmly in the shoulder 12 of the tool. In order to facilitate insertion and ejection suitable indicating means may be provided to indicate which side of the implement handle is to be held up for ejection and which side up for insertion of the small tool. When my device is inserted as a whole within a carpenter's hammer, for example, I prefer to place the pawl of the device in the handle in such manner that the pawl will be down when the claw of the hammer is up in a normal hammering position. If the small tool carried within my device is a punch, the hammer containing my device would be in this position ready for use, and the punch easily ejected as described above by merely pressing the top of the punch.

Furthermore I may state that the surface of the shoulder 12 may be slightly dished or inclined toward the center and point or bottom of the tool 7 so as to make more positive contact with the pawl 9. Also the pawl 9 may be suitably pointed and curved so as to engage more thoroughly with the indentation or shoulder 12. I am not to be limited to a gravitationally acting catch or retaining means however, as this is merely illustrated herein to show a simple and effective embodiment of my invention. Movement of a catch or pawl may be accomplished by other positive mechanical means but the illustrated device has the desirable characteristic of being extremely simple.

The device may be inserted in the handles of carpenters' or mechanics' hammers, screwdrivers, wrenches, etc. and may contain various small tools. A plurality of said devices may be inserted in larger tools. It is to be understood that I do not wish to be limited to the exact details herein set forth which may, obviously, be varied in detail without departing from the spirit of the invention as set forth in the appended claims.

What I claim is:

1. A device comprising an elongated hollow body portion, spring means for completely ejecting a small tool from said body portion, and gravitationally acting means positioned in one side of said hollow body portion adapted to engage with an indent in the small tool to retain same within said body portion when said gravitationally acting means is above said small tool, and to release said small tool when said gravitationally acting means is below said tool by a restricted longitudinal movement of the tool within said body portion in a direction opposed to the direction of ejection.

2. A device comprising an elongated hollow body portion having an enlarged outlet at one end thereof and containing a spring for ejecting a small tool from within said body portion, means for retaining said tool within said body portion, and means actuated by restricted longitudinal motion of the tool within said body portion in a direction opposed to the direction of ejection, and by a partial rotation of the hollow body portion, for releasing said tool retaining means and permitting ejection.

Signed at Los Angeles, Calif. this 3rd day of September, 1927.

MICHAEL P. ROKOS.